US005659749A

United States Patent [19]
Mitchell et al.

[11] Patent Number: 5,659,749
[45] Date of Patent: Aug. 19, 1997

[54] SYSTEM AND METHOD FOR PERFORMING EFFICIENT HARDWARE CONTEXT SWITCHING IN AN INSTRUMENTATION SYSTEM

[75] Inventors: Bob Mitchell; Brian Keith Odom, both of Travis County, Tex.

[73] Assignee: National Instruments Corporation, Austin, Tex.

[21] Appl. No.: 437,025

[22] Filed: May 8, 1995

[51] Int. Cl.$^6$ ............................................. G06F 9/00
[52] U.S. Cl. .................. 395/678; 395/853; 364/281.3; 364/281.7; 364/242.3
[58] Field of Search .................................. 395/842–848, 395/828, 834, 284, 375, 650, 775, 800, 825, 853, 678

[56] References Cited

U.S. PATENT DOCUMENTS

| | | | |
|---|---|---|---|
| 4,475,155 | 10/1984 | Oishi et al. | 395/872 |
| 5,182,800 | 1/1993 | Farrell et al. | 395/844 |
| 5,329,615 | 7/1994 | Peaslee et al. | 395/162 |
| 5,371,899 | 12/1994 | Peaslee et al. | 395/162 |
| 5,388,219 | 2/1995 | Chan et al. | 395/825 |
| 5,404,522 | 4/1995 | Carmon | 395/650 |
| 5,420,984 | 5/1995 | Good et al. | 395/842 |
| 5,428,779 | 6/1995 | Allegrucci et al. | 395/650 |

OTHER PUBLICATIONS

MC689440, *Dual–Channel Direct Memory Access Controller*, Motorola Semiconductor Products Inc., Austin, Texas, Feb., 1984, pp. 1–10 through 8-4, Foldout 1–8.

*Primary Examiner*—Lance Leonard Barry
*Attorney, Agent, or Firm*—Conley, Rose & Tayon; Jeffrey C. Hood

[57] ABSTRACT

A system and method for performing more efficient hardware context switches in a computer-controlled instrumentation system including a computer system which controls a plurality of instruments. The instrumentation system includes a direct memory access transfer device which performs various data transfers between the computer system and the various instruments. The direct memory access transfer device includes different hardware contexts for different transfers, and the DMA transfer device automatically configures itself to different contexts with minimal CPU involvement. For each process or thread requiring a different DMA transfer device context, the CPU prepares the context information and stores the context in memory. The CPU then provides a request list to the DMA transfer device including interleaved context pointers and data transfer packets. When the DMA transfer device is performing transfers and needs to switch to a new context, the DMA transfer device reads the context from memory and automatically configures itself. Since, the context is stored in memory and hence readily available, the DMA transfer device does not have to interrupt the CPU to receive a new context. Once the CPU has prepared and stored the context information and provided the address of the context information to the DMA transfer device, the DMA transfer device can switch between contexts for transfers corresponding to different processes or threads numerous times without CPU involvement, thus increasing system efficiency.

20 Claims, 6 Drawing Sheets

SYSTEM AND METHOD FOR PERFORMING EFFICIENT HARDWARE CONTEXT SWITCHING IN AN INSTRUMENTATION SYSTEM

FIELD OF THE INVENTION

The present invention relates to an instrumentation system including a direct memory access transfer device with improved hardware context switching capabilities that require minimal CPU involvement.

DESCRIPTION OF THE RELATED ART

Modern computer-controlled instrumentation systems typically include a computer system which controls a plurality of instruments to perform a desired test and measurement application. Accordingly, the computer system is required to control the operation of a number of different instruments. In computer systems which include modern multi-threaded, multitasking operating systems, a number of different processes or threads may be executing on the computer system CPU to control the operation of the plurality of instruments. Modern instrumentation systems also typically include a direct memory access DMA) device which performs the various transfers to decrease the workload of the CPU.

In an instrumentation system including multiple processes, each process generally requires that the instrumentation hardware, such as the direct memory access transfer device actually performing the transfer, be in a certain context or have a certain configuration in order to perform the desired transfer. For example, the respective hardware bus may include several different signalling or bus protocols, e.g., the MXI bus includes both a normal protocol and a high speed protocol. The process will typically specify or require that the DMA transfer device use a particular data transfer protocol for the transfer, and thus the data transfer protocol is set as part of the context for the device. The mode of operation of a direct memory access (DMA) transfer device is also part of its context. For example, U.S. patent application Ser. No. 08/423,469 filed Apr. 19, 1995 titled "System and Method for Performing Efficient Random Write Operations" discloses a direct memory access transfer device with a number of different modes Of operation. A process executing on the CPU may require that the DMA transfer device be configured in a certain mode to perform a certain type of transfer.

Therefore, the context of a DMA device performing a transfer may comprise a certain data transfer mode and a certain bus protocol, among other information. Before the DMA device begins a transfer which requires a new context, the transfer device must be programmed with a new context corresponding to the transfer. Thus the DMA transfer device must be able to quickly and efficiently switch between different contexts to perform the desired operations.

In modern prior art instrumentation systems, a context switch for a hardware device requires CPU intervention. When a hardware context switch is required, the software process interrupts the CPU, and the CPU then programs various registers in the hardware device according to the new desired context. In a system which includes multiple processes and hence multiple contexts, this can consume a large amount of CPU resources. Therefore, a system and method is desired for improved hardware context switching in an instrumentation system which requires minimal CPU involvement.

SUMMARY OF THE INVENTION

The present invention comprises a system and method for performing more efficient hardware context switches which minimize CPU involvement and thus increase system efficiency. The preferred embodiment of the invention comprises a computer-controlled instrumentation system including a computer system which controls a plurality of instruments. The computer system includes a CPU which executes one or more processes or threads to control the instruments, and memory coupled to the CPU. The computer system couples through one or more buses to a plurality of instruments. The instrumentation system includes a direct memory access (DMA) transfer device which performs various data transfers between the computer system and the various instruments. The DMA transfer device includes improved context switching capabilities which greatly reduce the amount of CPU intervention, thus increasing system efficiency.

In the preferred embodiment of the invention, processes or threads executing on the CPU provide transfer commands to the DMA device directing the DMA device to perform desired transfers. The DMA device receives and stores these transfer commands in a transfer queue for execution. The direct memory access transfer device includes a specific context for each transfer which includes one or more of a mode of operation to perform a type of transfer and a bus transfer protocol, among other information. Therefore, each of the processes or threads directs the DMA device to perform transfers wherein the DMA device may be required to have a different context or mode for each transfer. As the DMA device executes transfer commands from its transfer queue. The DMA transfer device automatically configures itself according to different contexts with minimal CPU involvement.

For each data transfer requiring a different DMA transfer device context, the CPU process prepares the context information and stores the context in memory. The process also provides a context pointer and transfer packet to a DMA manager. The DMA manager then provides a request list comprising pointers to the various context information and data transfer packets to the DMA transfer device. Thus, as the DMA device is executing transfer commands from its transfer queue, when it is necessary for the DMA transfer device to switch to a new context, the DMA transfer device reads the context from memory and automatically configures itself. Since the context is stored in memory and hence readily available, the DMA transfer device is not required to interrupt the CPU to receive a new context. Once the CPU has prepared and stored the context information and provided the request list to the DMA transfer device, the DMA transfer device can switch between contexts for different data transfers corresponding to different processes or threads numerous times without CPU involvement, thus increasing system efficiency.

Therefore, the present invention comprises a system and method for improved hardware device context switching with limited CPU involvement. This frees up CPU resources and thus increases system efficiency.

BRIEF DESCRIPTION OF THE DRAWINGS

A better understanding of the present invention can be obtained when the following detailed description of the preferred embodiment is considered in conjunction with the following drawings, in which.

DETAILED DESCRIPTION OF THE PREFERRED EMBODIMENT

Figure 1:
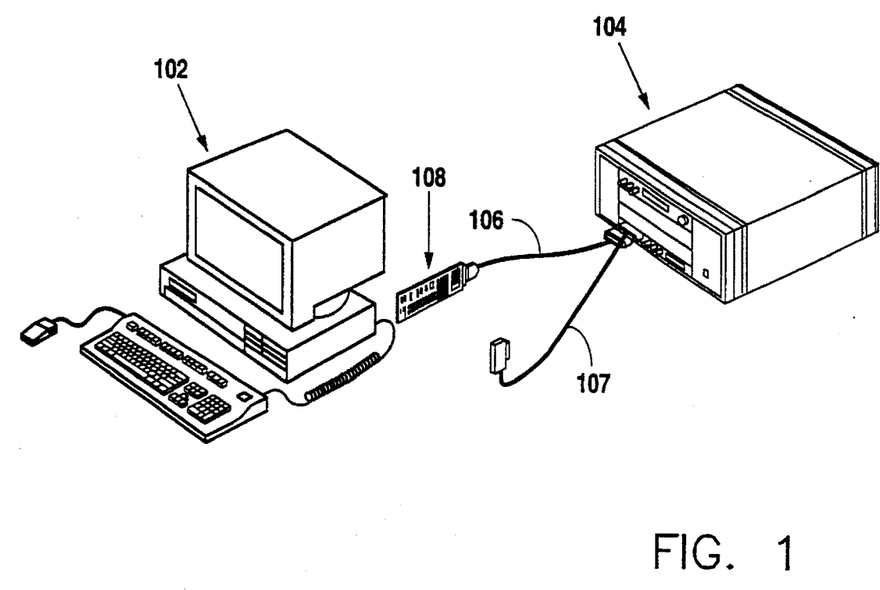
FIG. 1 illustrates an instrumentation system controlled by an external computer.
Figure 2:
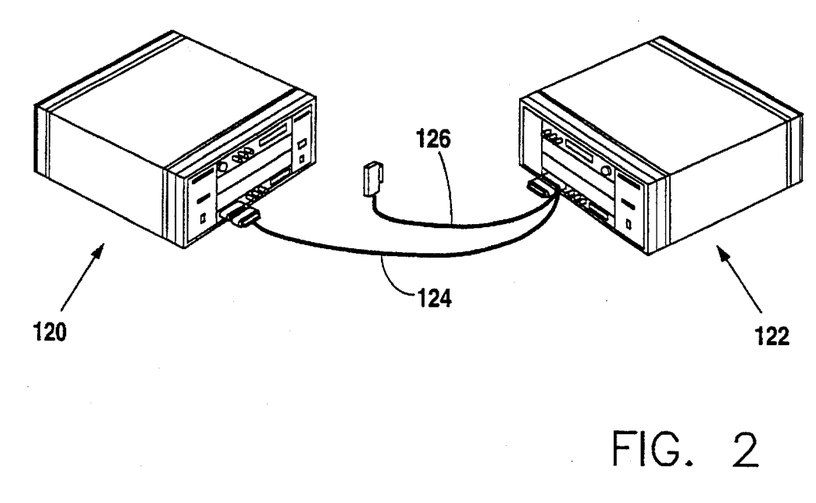
FIG. 2 illustrates an instrumentation system comprising two VXI mainframes controlled by an embedded CPU.

Referring now to FIGS. 1 and 2, instrumentation systems incorporating the system and method of the present invention are shown. As previously discussed, the present invention is preferably incorporated into an instrumentation system. However, it is noted that the present invention may be incorporated into other systems as desired. Also, the systems in FIGS. 1 and 2 are illustrative only, and it is noted that the present invention can be incorporated into various types of instrumentation systems.

The instrumentation system shown in FIG. 1 includes an external computer 102 preferably comprising a system unit, monitor, keyboard, and mouse, as shown. In the embodiment shown in FIG. 1, the external computer 102 includes an expansion bus, preferably based on the industry standard architecture (ISA), also referred to as the AT bus. It is noted that other expansion buses may be used as desired. The external computer 102 includes an interface card referred to as the AT-MXI interface card 108 (shown outside of the external computer for illustrative purposes) which interfaces between the expansion bus in the external computer 102 and a MXI bus implemented on MXI cable 106. The AT-MXI interface card 108 translates between AT bus signals in the external computer 102 and MXI bus signals in the MXI cable 106. The external computer 102 is coupled to a VXI mainframe 104 through the MX cable 106.

The VXI mainframe 104 includes a fixst VXI-MXI extender card (230 FIG. 3) which receives MXI signals from the MX cable 106 and translates these signals into VXI signals which are supplied to the VXI backplane or bus built into the VXI mainframe 104. A plurality of VXI instruments are preferably comprised within the VXI mainframe 104 connected to the VXI backplane. Therefore, the external computer 102 controls VXI instruments in the VXI mainframe 104 by generating signals across the expansion bus through the AT-MXI interface 103, the MXI cable 106, and to the VXI-MXI extender inside the VXI mainframe 104. The VXI-MXI extender converts the respective signals into VXI signals, which are then used to control the VXI instruments. The VXI mainframe 104 may also include a second VXI-MXI extender (230A FIG. 3) which connects to a second MXI cable 107 that is used for connecting to other VXI mainframes as shown. In this manner, a plurality of VXI mainframes 104 can be daisy-chained together to allow the external computer 102 to control a greater number of VXI instruments.

Referring now to FIG. 2, an alternate embodiment which implements the system and method of the present invention is shown. In the system shown in FIG. 2, an external computer is not used to control the instrumentation system, but rather a first VXI mainframe 120 includes an embedded CPU resource manager which controls VXI instruments in the first VXI mainframe 120 and also controls VXI instruments in a second VXI mainframe 122. The first VXI mainframe 120 includes a VXI-MXI extender (not shown) which translates VXI signals into MXI signals that are transferred over MXI cable 124 to the second VXI mainframe 122. The second VXI mainframe 122 includes a VXI-MXI extender (not shown) which translates the MXI signals into VXI signals that are provided over the VXI backplane to control the respective VXI instruments in the second VXI mainframe 122. In this manner, the embedded CPU resource manager inside the first VXI mainframe 120 controls VXI instruments in both the first and second VXI mainframes 120 and 122. Also, the second VXI mainframe 122 may include a second VXI-MXI extender (not shown) which connects to an additional MXI cable 126 that can connect to a third VXI mainframe (not shown) as desired. In this manner, any number of VXI mainframes can be daisy-chained together to allow the embedded CPU resource manager in the first VXI mainframe 120 to control any number of VXI instruments.

Figure 3:
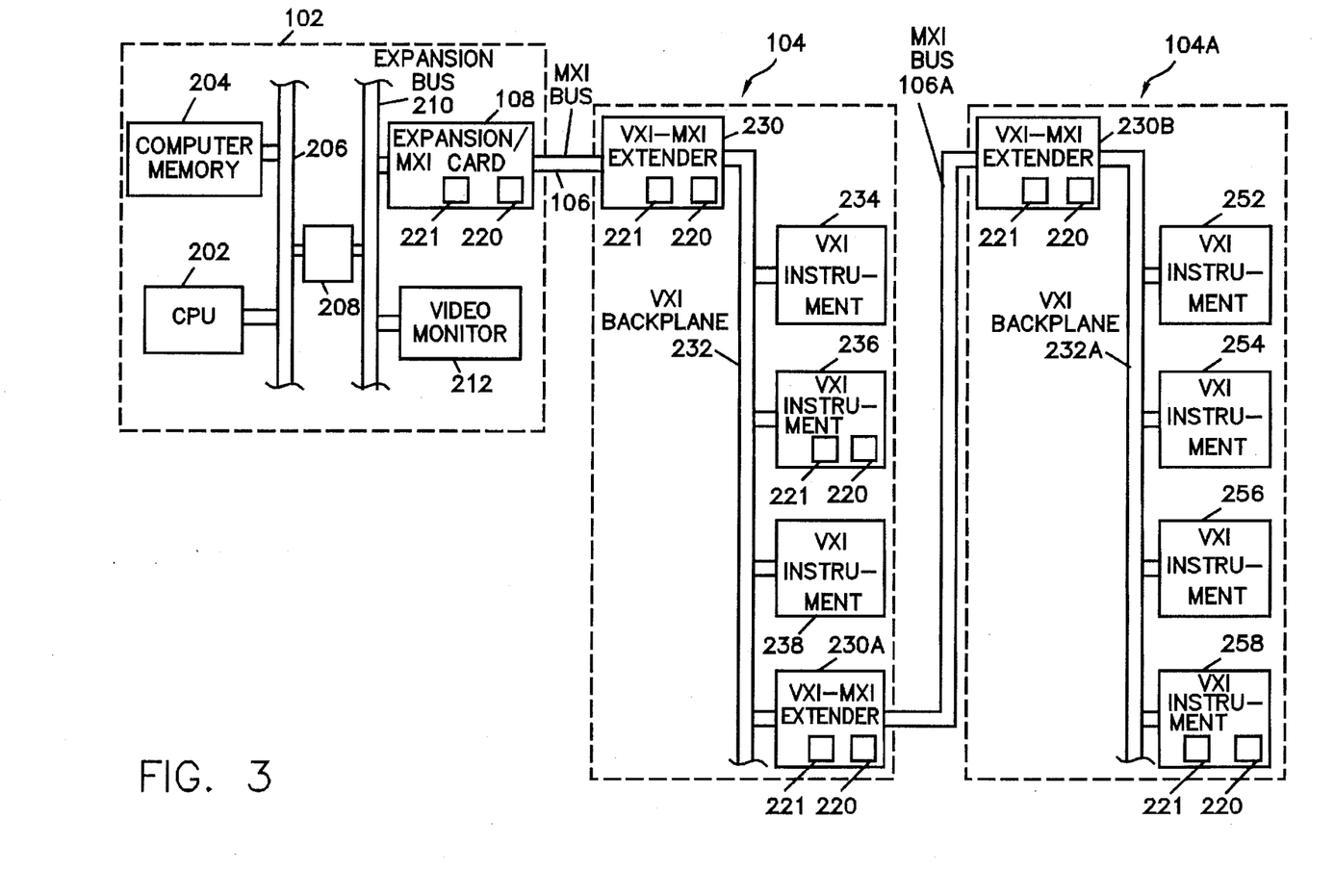
FIG. 3 is a block diagram of the instrumentation system of FIG. 1.

Referring now to FIG. 3, a block diagram illustrating the components comprising the instrumentation system in FIG. 1 is shown. As shown, the external computer 102 includes a CPU 202 and computer memory 204 connected to a system bus 206. The system bus 206 is connected through a bus interface 208 to an expansion bus 210. The expansion bus 210 can be based on any of the various types of bus standards, including the industry standard architecture (ISA), referred to as the AT bus, the extended industry standard architecture (EISA), microchannel architecture (MCA), and the NuBus, as well as others. In addition, the expansion bus can be a local bus such as the Peripheral Component Interconnect (PCI) bus or the VL bus. A video monitor 212 is coupled to the expansion bus 210. The expansion/MXI card 108 is preferably coupled to the expansion bus 210. As discussed above with regard to FIG. 1, the expansion bus used in the embodiment in FIG. 1 is the AT bus, and the expansion/MXI card is the AT-MXI interface card 108. The expansion MXI interface card 108 includes DMA transfer logic 221 for performing transfers between the computer system and the various instruments. As shown, the expansion/MXI interface card 108 also includes context switching logic 220 according to the present invention which performs context switching operations for data transfers performed by the DMA transfer logic 221.

The expansion/MXI card 108 couples through the MXI bus over a MXI cable 106 to a VXI-MXI extender 230. The VXI-MX extender 230 is coupled to a VXI backplane 232. A plurality of VXI instruments 234, 236, and 238 are preferably coupled to the VXI backplane as shown. The VXI-MX extender 230 translates MXI signals received from the MXI bus 106 into VXI signals that are provided over the VXI backplane 232 and vice-versa. The VXI-MXI extender 230 preferably includes DMA transfer logic 221 as well as context switching logic 220 according to the present invention, which is similar to the context switching logic 220 in the expansion/MXI card 108. One or more of these VX instruments, such as the VXI instrument 236, may also include DMA transfer logic 221 and context switching logic 220 according to the present invention. In one embodiment of the invention, the VXI mainframe 104 includes a second VXI-MXI extender 230A which couples through a second MX cable 106A to a second VXI mainframe 104A. The second VXI mainframe 104A includes a third VXI-MXI extender 230B which connects to the MXI bus 106A. The VXI-MXI extender 230B connects to a VXI backplane 232A. A plurality of VXI instruments 252, 254, 256, and 258 are connected to the VXI backplane 232A.

The third VXI-MXI extender 230B preferably includes DMA transfer logic 221 and context switching logic 220 according to the present invention. One or more of the VXI instruments 252–258, such as the instrument 258 may also include DMA transfer logic 221 and context switching logic 220 according to the present invention. It is noted that further VXI mainframes can be daisy-chained in this fashion, as desired. In the present disclosure, a device which includes the DMA transfer logic 221 and the context switching logic 220 is referred to as a DMA transfer device.

As discussed further below, when a DMA transfer device is required to perform a context switch to perform a transfer, the device dynamically reads the new context from memory and changes its context without CPU involvement. The process or thread is required to initially load the context into memory and provide the address of the context to the DMA transfer device. However, once the respective contexts have been loaded into memory, the DMA transfer device can dynamically switch between contexts "on-the-fly" numerous times without CPU involvement. Thus the DMA transfer device can perform transfer requests from multiple processes in multiple contexts or modes without CPU involvement.

Figure 4:
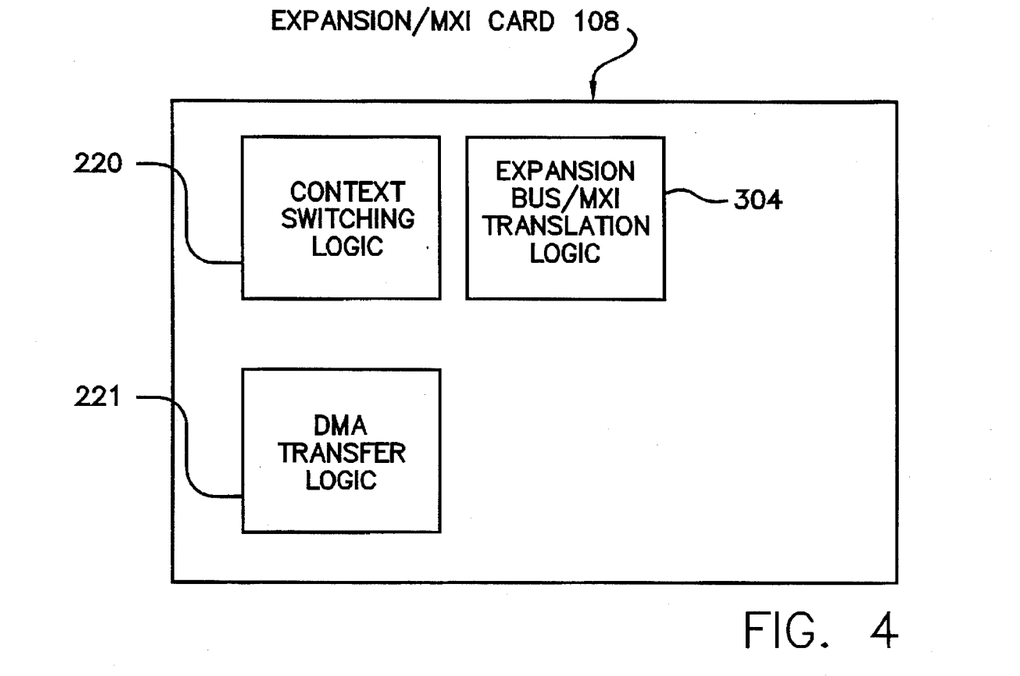
FIG. 4 is a block diagram of the expansion/MXI card in the block diagram of FIG. 3.
Figure 5:
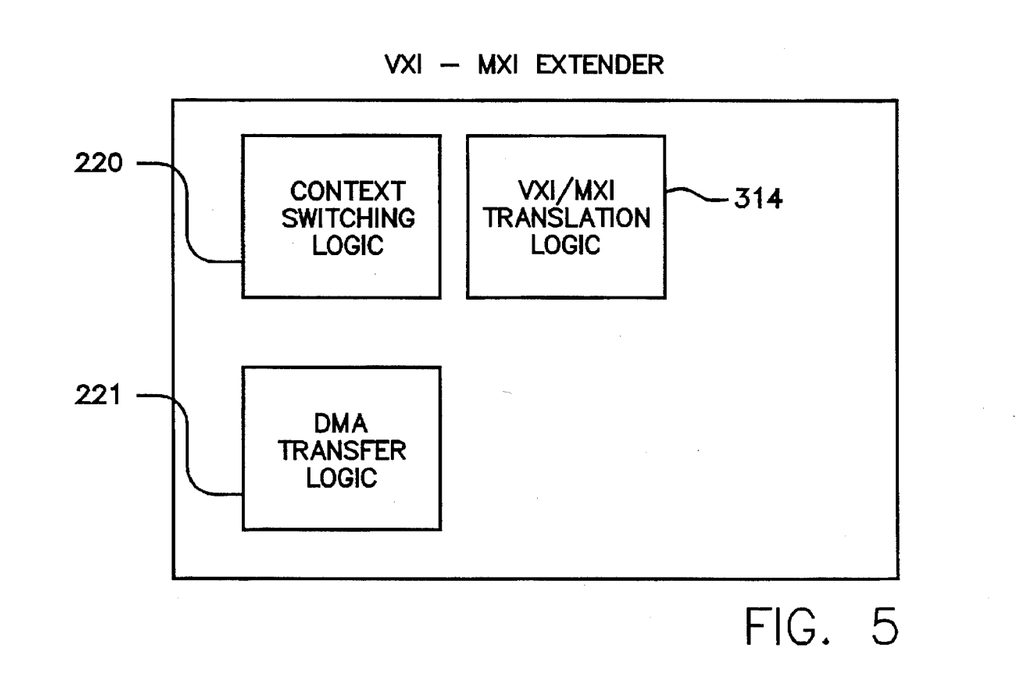
FIG. 5 is a block diagram of the VXI-MXI extender in the block diagram of FIG. 3.

Referring now to FIG. 4, a block diagram illustrating elements comprised in the expansion/MXI card 108 is shown. As shown, the expansion/MXI card 108 includes the context switching logic 220, the DMA transfer logic 221 and expansion/MXI translation logic 304. The DMA transfer logic 221 includes a transfer queue storing transfer commands, and the DMA transfer logic 221 executes these transfer commands as they arrive at the head of the queue to perform data transfers. As discussed above, the context switching logic 220 performs context switching operations according to the present invention. The expansion/MXI translation logic 304 converts signals between the expansion bus 210 and the MXI bus 106. Referring now to FIG. 5, a block diagram illustrating the components in each of the VXI-MXI extenders 230, 230A, and 230B are shown. In the preferred embodiment, the VXI-MXI extenders 230, 230A, and 230B are identical. As shown, each VXI-MXI extender includes context switching logic 220, DMA transfer logic 221, and VXI-MXI translation logic 314. As discussed above, the DMA transfer logic 221 includes a transfer queue and performs data transfers, the context switching logic 220 performs context switching operations according to the present invention, and the VXI/MXI translation logic 314 performs translations between VXI and MXI signals.

Referring again to FIGS. 1 and 3, in the preferred embodiment, DMA transfer logic 221 and context switching logic 220 according to the present invention are included on the AT-MXI interface card 108, one or more of the VXI-MXI extenders 230, 230A, and 230B in the VXI mainframes 104 and 104A, and one or more of the VXI instruments such as instruments 236 and 258. The context switching logic 220 enables the respective interface card 108 or extender 230, 230A, or 230B to dynamically change hardware contexts during DMA transfers without CPU intervention.

The instrumentation system includes multiple processes where each process generally requires that the DMA transfer device actually performing the transfer be in a certain context or have a certain configuration in order to perform the desired transfer. For example, the respective MXI and VXI buses include several different signalling or bus protocols, and the process typically requires that the DMA transfer device use a particular data transfer protocol for the transfer. Thus the data transfer protocol is set as part of the context for the device. In the preferred embodiment, each DMA transfer device includes a number of different modes of operation which form a part of the device context, and a process executing on the CPU may require that the DMA transfer device be configured in a certain mode to perform a certain type of transfer. For an example of different DMA transfer device modes, please see related U.S. patent application Ser. No. 08/423,469 filed Apr. 19, 1995 titled "System and Method for Performing Efficient Random Write Operations" which is hereby incorporated by reference.

Therefore, in the preferred embodiment the context of a DMA device performing a transfer comprises one or more of a certain data transfer mode and a certain bus protocol, among other information.

According to the prior art, if a DMA transfer device required a new context to perform a transfer, an interrupt was provided to the CPU 202 so that the CPU 202 could program the various hardware registers in the DMA transfer device according to the new desired context. If the DMA transfer device were executing multiple DMA transfers according to multiple different contexts, the CPU 202 would be constantly interrupted to change the hardware context of the DMA device. This consumes a considerable amount of CPU resources and thus decreases system efficiency. The present invention comprises a system and method whereby the DMA transfer device can dynamically configure itself with new hardware contexts on the fly during DMA transfers without CPU intervention. This greatly increases CPU and system performance.

Figure 6:
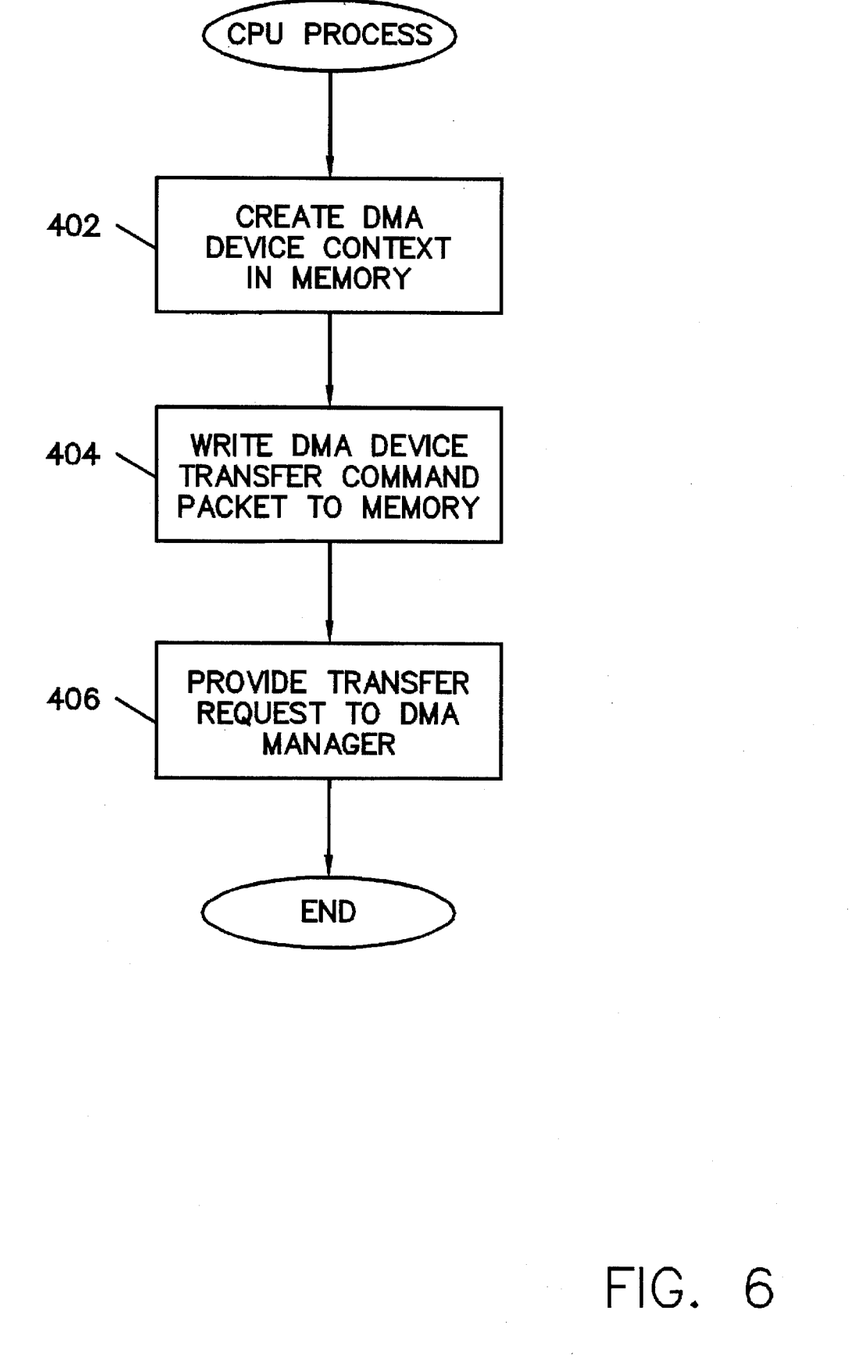
FIG. 6 is a flowchart diagram illustrating operation of processes executing on the CPU placing context data and transfer packets for the DMA transfer device in memory according to the present invention.

Referring now to FIG. 6, a flowchart diagram illustrating the operations of processes executing on the CPU 202 to place context data and transfer commands in memory 204 for the DMA transfer device is shown. In step 402 the process creates DMA device context data in memory 204. This context data comprises data for various registers in the DMA transfer logic 221 indicating the signalling protocol and mode of operation, as well as other information. In step 404 the process writes a DMA device transfer command packet to memory 204. In step 406 the process provides a transfer request to a DMA software manager executing on the CPU 202.

Figure 7:
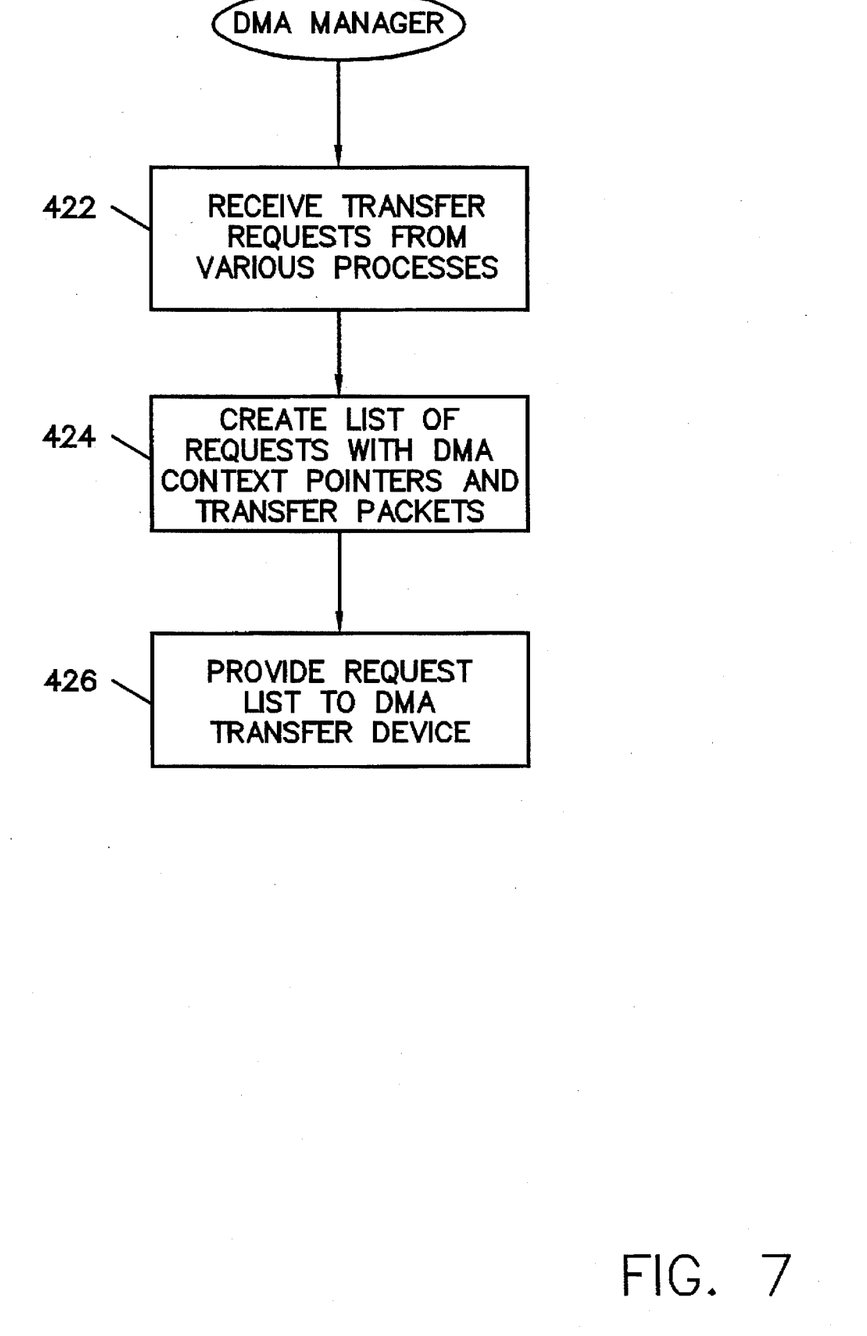
FIG. 7 is a flowchart diagram illustrating operation of the DMA software manager creating a request list and providing the request list to the DMA transfer device.

Referring now to FIG. 7, a flowchart diagram illustrating operation of the DMA software manager is shown. The DMA software manager monitors transfer requests from the various processes executing on the CPU 202 and creates request lists that it then provides to a respective DMA transfer device. In step 422 the DMA manager receives various transfer requests from the various processes executing on the CPU 202. In step 424 the DMA manager creates a list of requests with interleaved DMA context pointers and transfer packets. In step 426 the DMA manager provides the request list to the transfer queue in the DMA transfer device. The request list includes a series of interleaved context pointers and data transfer commands. The context pointer comprises a pointer to the desired context for the respective transfer, i.e., the address of the context data stored in the memory which is desired for this transfer command. The transfer command packet includes the number of bytes of data to be transferred and the source and destination locations. Other types of information may be included in the transfer command packet as desired.

Therefore, for each data transfer operation, the request list created by the DMA manager in step 424 generally includes a pointer to the respective context information or data for the respective transfer followed by the corresponding transfer packet. It is noted that, for data transfers which use the same DMA transfer device context, a separate context pointer for each of these transfers is not necessary..Thus, when the DMA software manager is creating a request list, if four data transfers use the same context, the request list comprises a context pointer followed by the four data transfer packets. If a data transfer packet is not immediately preceded by a context pointer in the request list, the DMA transfer device uses its current context. This eliminates unnecessary context changes.

In the preferred embodiment,. the DMA software manager provides the request list to the DMA transfer logic 221 in the expansion/MXI card 108. In the system of FIG. 3, the DMA manager can provide the request list to any device or instrument acting as a DMA transfer device, i.e., any device which includes DMA transfer logic 221 and context switching logic 220 according to the present invention. In the preferred embodiment, the DMA manager generally provide request lists to the expansion/MXI card 108.

Figure 8:
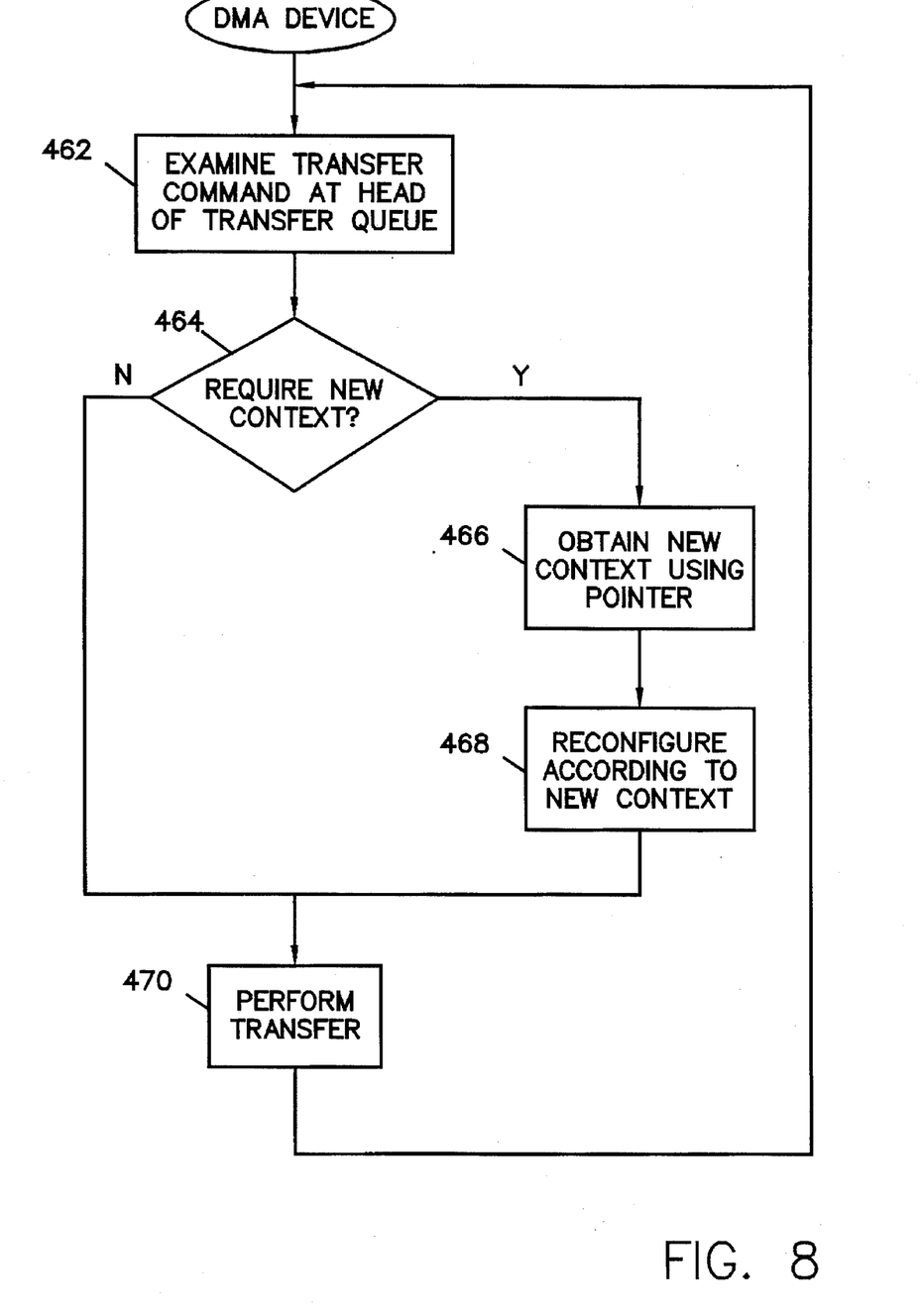
FIG. 8 is a flowchart diagram illustrating operation of the DMA transfer device performing context switches during data transfers according to the present invention.

Referring now to FIG. 8, the operation of the DMA device in executing transfer commands in its transfer queue is shown. As the DMA manager executing on the CPU 202 provides request lists to the DMA transfer device, the DMA transfer logic 221 receives these request lists and stores them in a transfer queue, which is preferably a first-in first-out (FIFO) queue. In step 462 the DMA device examines the command at the head of its transfer queue to determine if a context pointer is at the head of the queue. If the command is a context pointer, i.e., a new context is required in step 464, then in step 466 the DMA transfer device obtains the new context from the memory 204 using the pointer. In step 468 the DMA device reconfigures itself according to the new context. This involves using the context data retrieved from memory 204 to load registers within the DMA transfer device which change the context or mode of operation of the device. In step 470 the DMA transfer device performs the transfer indicated by the transfer command using the new context. If the transfer command being executed is not preceded by a context pointer and thus does not require a new context in step 464, then the DMA transfer device proceeds directly to step 470 and performs the transfer using its current context.

As noted above, where a request list includes a plurality of transfer command packets which all require the same device context, the request list preferably includes a pointer to the correct context data followed by all of the transfer command packets which use that context. In this manner, the context pointer is at the head of the transfer queue, and the DMA device performs steps 466 and 468 to obtain the new context and reconfigure itself according to the new context. However, for the remaining transfer command packets that require this context, the DMA transfer device can proceed directly from step 464 to step 470, since a new context is not required.

Therefore, the present invention allows a hardware device to perform context switching operations with minimal CPU involvement. Although the method and apparatus of the present invention has been described in connection with the preferred embodiment, it is not intended to be limited to the specific form set forth herein, but on the contrary, it is intended to cover such alternatives, modifications, and equivalents, as can be reasonably included within the spirit and scope of the invention as defined by the appended claims.

We claim:

1. A method for performing context switches during data transfers in an instrumentation system comprising a CPU, a memory coupled to the CPU, a plurality of instruments, and a direct memory access transfer device coupled to the memory and the plurality of instruments, wherein the plurality of instruments perform desired tests and measurements, the method comprising the steps of:

storing a first context for the direct memory access transfer device in the memory at a first address;

creating a first data transfer packet indicating a transfer of data, wherein said transfer of data requires the direct memory access transfer device to have said first context;

providing said first address of said first context and said first data transfer packet to the direct memory access transfer device;

the direct memory access transfer device receiving said first address and said first data transfer packet indicating a transfer of data;

the direct memory access transfer device reading said first context from the memory using said first address;

the direct memory access transfer device configuring itself according to said first context after said step of reading said first context from the memory; and the direct memory access transfer device executing said first data transfer packet to perform said transfer of data after said step of configuring.

2. The method of claim 1, wherein said steps of the direct memory access transfer device reading said first context from the memory using said first address and configuring itself according to said first context do not require CPU involvement.

3. The method of claim 1, further comprising:

storing said first data transfer packet in the memory after said creating said first data transfer packet;

wherein said step of providing said first address and providing said first data transfer packet comprises:

creating a request list comprising said first address and said first data transfer packet; and transferring said request list to the direct memory access transfer device.

4. The method of claim 1, wherein said instrumentation system further comprises a bus, wherein said plurality of instruments are coupled to said bus, wherein said first context comprises a transfer protocol on said bus and a mode of said direct memory transfer device.

5. The method of claim 1, further comprising:

storing a second context for the direct memory access transfer device in the memory at a second address;

creating a second data transfer packet indicating a second transfer of data, wherein said second transfer of data requires the direct memory access transfer device to have said second context;

providing said second address of said second context and said second data transfer packet to the direct memory access transfer device;

the direct memory access transfer device receiving said second address and said second transfer packet indicating said second transfer of data;

the direct memory access transfer device reading said second context from the memory using said second address;

the direct memory access transfer device configuring itself according to said second context after said step of reading said second context from the memory; and the direct memory access transfer device performing said second transfer of data after said step of configuring.

6. A method for performing context switches in an instrumentation system comprising a CPU, a memory coupled to the CPU, a plurality of instruments, and a direct memory access transfer device coupled to the memory and the plurality of instruments, the method comprising the steps of:

storing a plurality of contexts for the direct memory access transfer device in the memory at various addresses;

creating a plurality of transfer packets indicating transfers of data, wherein each of said transfers of data require said direct memory access transfer device to have one of said plurality of contexts;

providing said addresses of said plurality of contexts and said plurality of transfer packets to said direct memory access transfer device;

the direct memory access transfer device receiving said addresses of said plurality of contexts and said plurality of transfer packets;

the direct memory access transfer device reading one of said plurality of contexts from said memory;

the direct memory access transfer device configuring itself according to said one of said plurality of contexts after said step of reading said one of said plurality of contexts from the memory; and the direct memory access transfer device executing one of said plurality of transfer packets to perform a transfer of data after said step of configuring.

7. The method of claim 6, wherein said steps of the direct memory access transfer device reading said one of said plurality of contexts from the memory using said first address and configuring itself according to said one of said plurality of contexts do not require CPU involvement.

8. The method of claim 6, wherein said step of providing said addresses and said plurality of transfer packets comprises:

creating a request list comprising said plurality of addresses and said plurality of transfer packets; and transferring said request list to the direct memory access transfer device.

9. The method of claim 8, wherein said direct memory access transfer device performs said steps of reading, configuring, and executing for said plurality of addresses and said plurality of transfer packets in said request list.

10. The method of claim 9, further comprising the direct memory access transfer device storing said request list in a transfer queue;

wherein said step of reading one of said plurality of contexts includes obtaining an address of said one of said plurality of contexts from said transfer queue;

wherein said step of executing one of said plurality of transfer packets includes obtaining the transfer packet immediately following said address of said one of said plurality of contexts from said transfer queue.

11. A method for performing context switches in an instrumentation system comprising a CPU, a memory coupled to the CPU, a plurality of instruments, and a direct memory access transfer device coupled to the memory and the plurality of instruments, wherein the plurality of instruments perform desired tests and measurements, the method comprising the steps of:

storing a first context for the direct memory access transfer device in the memory at a first address;

providing said first address of said first context to the direct memory access transfer device;

the direct memory access transfer device receiving said first address;

the direct memory access transfer device reading said first context from the memory using said first address; and the direct memory access transfer device configuring itself according to said first context after said step of reading said first context from the memory.

12. The method of claim 11, wherein said steps of the direct memory access transfer device reading said first context from the memory using said first address and configuring itself according to said first context do not require CPU involvement.

13. The system of claim 11, wherein said context switching logic in the direct memory access transfer device reads said one of said one or more contexts from the memory using said one of said one or more addresses and configures the direct memory access transfer device according to said one context without CPU involvement.

14. A system including a direct memory access transfer device which performs context switching operations with minimal CPU involvement, comprising:

a memory;

a plurality of instruments which perform desired tests and measurements, a direct memory access transfer device coupled to said memory and said plurality of instruments;

a CPU coupled to said memory which stores one or more contexts for the direct memory access transfer device in said memory at one or more addresses and provides said addresses to said direct memory access transfer device, wherein said CPU also provides a plurality of transfer commands to the direct memory access transfer device indicating transfers of data, wherein each of said transfers of data require said direct memory access transfer device to have one of said one or more contexts;

wherein the direct memory access transfer device includes context switching logic which reads one of said one or more contexts from said memory using one of said one or more addresses for one of said transfer commands and configures the direct memory access transfer device according to said one of said one or more contexts.

15. The system of claim 14, wherein said direct memory access transfer device further includes means for performing said transfers of data according to said transfer commands using said one of said one or more contexts.

16. The system of claim 14, wherein said direct memory access transfer device further includes:

a transfer queue which receives and stores said one or more addresses and plurality of transfer commands indicating transfers of data, wherein each of said transfers of data require said direct memory access transfer device to have one of said one or more of contexts;

wherein said context switching logic includes:

means for examining said transfer commands in said transfer queue;

means for reading a context from said transfer queue; and means for configuring said direct memory access transfer device according to said context.

17. A method for performing context switches during data transfers in a system comprising a CPU, a memory coupled to the CPU, one or more devices, and a direct memory access transfer device coupled to the memory and the one or more devices, the method comprising the steps of:

- storing a first context for the direct memory access transfer device in the memory at a first address;
- creating a first data transfer packet indicating a transfer of data, wherein said transfer of data requires the direct memory access transfer device to have said first context;
- providing said first address of said first context and said first data transfer packet to the direct memory access transfer device;
- the direct memory access transfer device receiving said first address and said first data transfer packet indicating a transfer of data;
- the direct memory access transfer device reading said first context from the memory using said first address;
- the direct memory access transfer device configuring itself according to said first context after said step of reading said first context from the memory; and
- the direct memory access transfer device executing said first data transfer packet to perform said transfer of data after said step of configuring.

18. The method of claim 17, wherein said steps of the direct memory access transfer device reading said first context from the memory using said first address and configuring itself according to said first context do not require CPU involvement.

19. The method of claim 17, further comprising:

- storing said first data transfer packet in the memory after said creating said first data transfer packet;
- wherein said step of providing said first address and providing said first data transfer packet comprises:
- creating a request list comprising said first address and said first data transfer packet; and
- transferring said request list to the direct memory access transfer device.

20. The method of claim 17, wherein said instrumentation system further comprises a bus, wherein said plurality of instruments are coupled to said bus,

- wherein said first context comprises a transfer protocol on said bus and a mode of said direct memory transfer device.

* * * * *

UNITED STATES PATENT AND TRADEMARK OFFICE
CERTIFICATE OF CORRECTION

PATENT NO. : 5,659,749
DATED : August 19, 1997
INVENTOR(S) : Mitchell, et. al.

It is certified that error appears in the above-identified patent and that said Letters Patent is hereby corrected as shown below:

Claim 13, col. 10, lines 17 through 22, should be Claim 15.

Claim 14, col. 10, lines 23 through 47, should be Claim 13.

Claim 15, col, 10, lines 48 through 51, should be Claim 14. Also in this claim please change "The system of claim 14," to "The system of claim 13,".

Claim 16, col, 10, line 52, please change "The system of claim 14," to "The system of claim 13,".

Signed and Sealed this

Twenty-third Day of December, 1997

Attest:

BRUCE LEHMAN

Attesting Officer

Commissioner of Patents and Trademarks